United States Patent Office 3,210,242
Patented Oct. 5, 1965

3,210,242
SYSTEMIC INSECTICIDAL ALKYLCARBAMOYL-METHYL DIMETHYLPHOSPHORODITHIOATES
Richard W. Young, Cos Cob, and Elton L. Clark, Bethel, Conn., assignors to American Cyanamid Company, New York, N.Y., a corporation of Maine
No Drawing. Filed May 1, 1961, Ser. No. 106,457
2 Claims. (Cl. 167—22)

The instant application constitutes a continuation-in-part of our copending application, Serial No. 668,875, filed July 1, 1957.

This invention relates to the control of insects which infest growing plants. As such it is concerned with a novel group of compounds which are systemically active insecticides of low mammalian toxicity. More particularly, this application is concerned with a novel group of N-alkyl-substituted carbamoylmethyl dimethylphosphorodithioates which may be represented by the general formula $$\text{Alk-NHCOCH}_2\text{SSP(OCH}_3)_2 \qquad (I)$$

wherein Alk is an alkyl radical selected from methyl, ethyl, n-propyl, i-propyl and t-butyl, and to an improved preparation thereof.

Recently, much interest has been shown in the development of systemic insecticides. Such utilization, however, means that a product to be of potential interest not only must be active against the indicated pest but have low mammalian toxicity. For this reason, in the present invention, only those products are considered as useful which meet two requirements. First, in a standard test for systemic activity, at least 50% of the test animals should be killed at concentrations of one part per million or less. Second, in a standard test for acute mammalian toxicity the maximum tolerated dose should be at least 125 mg. per kg.

Surprisingly, these properties are found combined in the group of compounds noted above when the latter are in sufficiently purified form. This limited group of compounds falls within a class of compounds for which a general method of preparation is shown in United States Letters Patent 2,494,283.

As shown therein, a carbamoylalkyl chloride or bromide, such as chloroacetamide, may be reacted in a ketone solvent, such as acetone, with one molecular equivalent of a salt of a dialkylphosphorodithioic acid and an "alkali-forming metal." The latter term is used to include the alkali metal, ammonium and alkaline earth metal ions. The reaction is said to proceed as follows:

$$(\text{CH}_3\text{O})_2\text{PSSNa} + \text{Cl-CH}_2\text{CONH}_2 \rightarrow$$
$$\text{NaCl} + \text{H}_2\text{NCOCH}_2\text{SSP(OCH}_3)_2$$

While the N-monoalkyl compounds of the present invention may be so prepared, unfortunately the yields of sufficiently purified products are poor. Large amounts of O,O,S-trimethyl phosphorodithioate $$[(\text{CH}_3\text{O})_2\text{PSSCH}_3]$$

are formed, presumably by reaction of the N-monoalkyl phosphorodithioate and the salt of the phosphorodithioic acid. Not only do the N-mono-alkyl compounds of the present invention have generally lower melting points than the unsubstituted products, but also a generally higher level of solubility in organic solvents. Isolation of the product from crude reaction mixtures containing large amounts of the trimethyl ester impurity is difficult.

This question of purity is found to be of marked importance, both as to the effectiveness of the agent and as to the question of toxicity. It is, therefore, also a principal object of the present invention to develop a procedure whereby better yields of purified product can be more simply and easily obtained.

This object has been surprisingly well accomplished by a novel combination of processing features characterized by the use of a heterogeneous solvent medium. In general, they comprise bringing a salt of the phosphorodithioic acid into reactive contact with a carbamoylalky halide in a mutual solvent in the presence of a second solvent.

The latter solvent should be substantially immiscible with the first and capable of dissolving the reaction product. The dithioic acid per se may or may not be soluble therein, but the acid salt should be preferentially soluble in the other phase during the reaction. The halogenated amide distributes between both phases after admixture of the solvents. Reaction is accomplished under agitation at temperatures ranging from room temperature to the boiling point of the solvent mixture. Thereafter agitation is stopped, the solvent layers allowed to separate. The product-bearing phase is removed and the product is recovered therefrom.

In the process of the above-noted patent, salts of dithioic acids and "alkali-forming metals" are used. Such salts also may be used in the process of the present invention, if so desired. In accordance with the present invention, it has been found that improved results over the earlier process can be obtained by the use of a tertiary amine salt of the acid. For this purpose, triethylamine is excellent. Because of its availability it will usually be selected. However, other salt-forming tertiary amines such as trimethyl amine, pyridine, quinoline, dimethylaniline and the like may be used.

Suitable carbamoylalkyl halides for the process of the present invention are known.

Because water is a completely satisfactory solvent both for the amide halide and for the salt of the acid it generally will be used as one component of the system. The other solvent component will usually be an incompatible organic solvent such as benzene, toluene, xylene, chloroform, methylene and ethylene dichlorides, chlorobenzene and the like. Saturated hydrocarbon solvents such as hexane, heptane, cyclohexane and the like are not satisfactory because of their low solvent power for the reaction products. Because the useful organic solvents in general boil above the melting point of the products, solvents which boil below about 90–95° C. are to be preferred as facilitating product recovery.

It is an advantage of the invention that the mode of reactant addition is not critical and the process may originate with either reactant. It is usually convenient to start with a solution of one of the reactants in a suitable solvent. The other reactant is then admixed therewith, either per se or in solution. The immiscible solvent may be added separately at any stage of the admixing schedule or as a solvent for one of the reactants.

For purpose of illustration, the process will be first discussed as being initiated with a solution of the amide halide. As noted above, water is the most practical solvent for the amide halides and ordinarily will be used. This practice has the further advantage that subsequently the immiscible layer containing the product may be washed with an aqueous alkaline solution such as sodium carbonate or bicarbonate to remove any unreacted acid.

To this amide halide solution is added the dithioate and/or the heterogeneous solvent. The acid salt may be added as such if so desired. Ordinarily, however, it will be added as a solution, usually, in the first solvent which in the illustrative case is water, the other solvent being furnished either prior to or concurrently with the acid salt. If so desired, the dithioic acid and a salt-forming compound may be separately added. The free acid is soluble in some organic solvents and may be added as a solution therein, the salt-forming compound being separately added to form the salt in the water phase.

In this discusssion, the term "salt-forming compound" is intended to include not only the above-noted tertiary amines but such compounds as potassium or sodium hydroxides, sodium bicarbonate or carbonate, and the like.

If so desired, the acid salt or its components may be taken first in the water phase. Again, the salt will be in the water phase, whether the additional solvent is present or added later. Since the halogenated amide is usually soluble in the organic solvent, its addition as a solution in such solvents is also a convenient method of combining all the components.

There is an advantage in adding to the reaction vessel both solvents and all of either the acid salt or the amide halide. If the other reactant is then added over a period of time a more satisfactory reacted mixture is obtained. For this purpose it is obviously advantageous to have both reactants in solution. However, in such a procedure the initial added reactant is present in excess at all times. Since it is preferable to have the amide halide present in excess, it will be the usual starting reactant.

As noted above, a feature of the present invention is the use of tertiary amine salts. The triethylamine salt being typical will be taken as illustrative. The amine salt may be formed in any desired way, perhaps the simplest being to dissolve the dithioic acid in a suitable solvent such as benzene and add thereto about a molar equivalent of the amine.

Two procedures are then open. The whole reaction may be carried out in a single organic solvent such as benzene. This will produce better results than are obtained in the process disclosed in the above-noted patent. This forms the subject matter of the copending application, of one of the present applicants, Serial No. 668,849, filed July 1, 1957. However, this should not be confused with the second procedure, i.e., the process of the present application in which the benzene or the like is used as a heterogeneous solvent phase in the presence of water or other immiscible solvent.

While the present process is not critical as to reagent proportions, because of the purification problems which result from an unnecessary excess being present, all reactants should be supplied in about molecularly equivalent amounts. A few percent excess of the amide halide reactant may help in insuring speedy reaction but appreciable excess should be avoided.

In general, the compounds of the present invention are white crystalline solids of relatively low melting point and high solubility in aromatic hydrocarbon, ketone and alcoholic solvents. Since in the present invention the product is in the organic solvent phase, it is readily isolated by washing, as noted above, and then evaporating the solvent. This usually leaves an oily residue which is readily dissolved and recrystallized to well defined products of sharp melting point. Suitable solvents include alcohol, ether, aqueous alcohol and alcohol ether mixtures.

Preparation of the products of the present invention may be readily illustrated in the following examples which are intended for that purpose only. Unless otherwise noted all parts are by weight and temperatures are in degrees centigrade. In each case, analyses of carbon, hydrogen and phosphorus were found to check with the theoretical values.

EXAMPLE 1

An aqueous solution of 129 parts of 2-chloro-N-methylacetamide in 100 parts of water is warmed to 40–50° C. and layered with 200 parts of toluene and the mixture brought to reflux on the steam bath. To this mixture is added over 30 minutes with stirring a solution of 158 parts of O,O-dimethylphosphorodithioic acid and 66 parts of potassium hydroxide (85%) in 200 parts of water while gentle reflux is maintained. The aqueous layer is separated and extracted with 2 x 100 cc. portions of toluene. The combined toluene layer and extracts are washed with saturated aqueous potassium bicarbonate and with water and concentrated to about ½ the original volume. About 140 parts of O,O-dimethyl S-(N-methylcarbamoylmethyl) phosphorodithioate is crystallized by chilling the solution in ice. The product when recrystallized from absolute ether to produce the analytical sample has a M.P. 52–53°.

EXAMPLE 2

The procedure of Example 1 is repeated substituting benzene for the toluene and 40 parts of sodium hydroxide for the potassium hydroxide. About 150 parts of the same product results from chilling the mixture.

EXAMPLE 3

To illustrate the procedure using a heavier than water solvent, Example 1 is repeated substituting ethylene chloride as the organic solvent. Concentration of the ethylene chloride extract and washings followed by chilling produce about 140 parts of identical crystalline product.

EXAMPLE 4

The procedure of Example 1 is repeated except that the mixture is held at about 40–50° C. for 18 hours with agitation. About 100 parts of identical product is obtained.

EXAMPLE 5

A mixture of 300 parts of water and 200 parts of toluene are warmed to 80° on the steam bath and 129 parts of 2-chloro-N-methylacetamide is added. To the stirred mixture there is added 223 parts of potassium O,O-dimethylphosphorodithioate in small portions over a 30 minute period while maintaining gentle reflux. The aqueous layer is separated and the toluene layer is washed with saturated aqueous sodium bicarbonate solution and with water. The toluene is removed by distillation under vacuum and the product is obtained by cooling the residual oil in ice. About 140 parts of O,O-dimethyl-S-(N-methylcarbamoylmethyl) phosphorodithioate was obtained, M.P. 52–53°.

EXAMPLE 6

The procedure of Example 5 was repeated substituting 203 parts of ammonium O,O-dimethylphosphorodithioate for the potassium salt. A yield of 120 parts of substantially pure product was obtained.

EXAMPLES 7–11

The procedure of Example 1 was followed but substituting molecularly equivalent amounts of different carbamoylalkyl halides. The latter, which may be represented by the illustrative formula Alk-NHCOCH$_2$Cl          (II)

are indicated in the following Table I by reference to the group "Alk" in Formula II. It also corresponds to the same symbol in Formula I above. The melting points shown in Table I are for product compounds of Formula I wherein "Alk" has the indicated value.

Table I

| Ex. No. | "Alk" | Product M.P. (° C.) |
|---|---|---|
| 7 | Ethyl | 67–68 |
| 8 | n-Propyl | 63.5–64 |
| 9 | i-Propyl | 76–77 |
| 10 | t-Butyl | 58–60.5 |

EXAMPLES 12–14

For purposes of comparison and to further illustrate the versatility of the heterogeneous solvent process, a number of additional compounds were prepared by repeating the procedure of Example 2 with additional carbamoyl chlorides. The latter and the product melting points are shown in Table II, again using the same designations as in Table I.

*Table II*

| Ex. No. | "Alk" | Product M.P. (° C.) |
|---|---|---|
| 12 | Allyl | 57.5-58 |
| 13 | n-Butyl | 30.5-31 |
| 14 | Isobutyl | 68.5-69 |

EXAMPLE 15

To illustrate the use of tertiary amine salts according to this invention, a solution of 24.4 parts (.25 mol) of triethylamine in 20 parts of benzene is added to a stirred solution of 43 parts (.24 mol) of O,O-dimethylphosphorodithioic acid in 50 parts of benzene, the temperature being maintained between 15–25° C. during the addition. A mixture of 36 parts (.242 mol) of 2-chloro-N-t-butyl-acetamide in 50 parts of water is added and the reaction mixture stirred at room temperature for 23 hours. The aqueuos layer is separated and the benzene solution is washed successively with 5% aqueous sodium bicarbonate and with saturated sodium chloride solution. The benzene solution is dried over anhydrous magnesium sulfate and then concentrated under vacuum to give 58 parts of an oily residue. The residue is recrystallized from absolute ether to give 30 parts of O,O-dimethyl S-(N-t-butyl) carbamoylmethyl phosphorodithioate, M.P. 58–60.5° C.

EXAMPLE 16

In order to compare the present process with the prior use of a ketone solvent in a single phase, 196 parts of potassium O,O-dimethylphosphorodithioate is dissolved in 1800 parts of acetone, and 107 parts of 2-chloro-N-methyl-acetamide is added thereto. The mixture is stirred at 25–30° for 72 hours. Acetone was distilled off, the residue taken up in toluene, and 45 parts of product (M.P. 50–51°) recovered on working up as in Example 1. On the basis of dithioate charged, the procedures of Eamples 1, 2, 3, 5, 6 and 15 produced 300–400% higher weights of product.

EXAMPLE 17

The acute toxicity for each of the compounds of Examples 1 and 7–14, supra, was established in mg./kg. in test animals (mice) by known procedures. For purposes of comparison, toxicity was also established for several compounds designated below as Compounds A to F, some of which are disclosed in the above-discussed patent.

Compound: Product
A _____ $HNHCOCH_2SSP(OCH_3)_2$
B _____ $HNHCOCH_2SSP(OC_2H_5)_2$
C _____ $CH_3NHCOCH_2SSP(OC_2H_5)_2$
D _____ $C_2H_5NHCOCH_2SSP(OC_2H_5)_2$
E _____ $(CH_3)_2CHNHCOCH_2SSP(OC_2H_5)_2$
F _____ $(CH_3)_2NCOCH_2SSP(OCH_3)_2$ Typical results are shown below in Table III wherein "Alk" as in Formula I, supra, is again used to designated compounds prepared in the preceding examples.

*Table III*

| Compound (Alk): | Max. tol. dose (mg./kg.) |
|---|---|
| Methyl | 125 |
| Ethyl | 125 |
| Allyl | 250 |
| n-Propyl | 175 |
| Iso-propyl | 200 |
| n-Butyl | 175 |
| Iso-butyl | 175 |
| t-Butyl | 175 |
| A | 250 |
| B | 10 |
| C | 5 |
| D | 40 |
| E | 20 |
| F | 250 |

From these tests, and others, it may be concluded that of the class of carbamoylmethyl, O,O-di-alkylphosphorodithioates, only the O,O-dimethyl group can be expected to have sufficiently low mammalian toxicity to meet the limitations discussed above and warrant investigation of their systemic activity.

EXAMPLE 18

The compounds of Examples 1 and 7–14, supra, and Compounds A and F as representative of previously-known compounds were tested for plant systemic activity. This test was conducted according to the procedure now shown in "J. Ag. Food Chem.," vol. III (1955), page 835. Testing was carried out at concentrations ranging from 100 parts per million down to 0.1 part per million, being stopped in most cases after a less than 50% effective kill. Typical results are shown below in Table IV wherein the compounds, except Compound A are again designated by the "Alk" constituent of Formula I, supra.

*Table IV*

| Compound (Alk) | Concentration (parts per million) | | | | | |
|---|---|---|---|---|---|---|
| | 100 | 10 | 5 | 1 | 0.5 | 0.1 |
| | (Percent kill) | | | | | |
| Methyl | 100 | 100 | 100 | 90 | 24 | |
| Ethyl | 100 | 100 | 100 | 95 | 84 | 7 |
| Allyl | 100 | 94 | 84 | 8 | | |
| n-Propyl | 100 | 100 | 93 | 50 | 33 | |
| i-Propyl | 100 | 100 | 100 | 83 | 71 | 6 |
| n-Butyl | 100 | 38 | | | | |
| i-Butyl | 100 | | 71 | 15 | | |
| t-Butyl | 100 | 90 | 82 | 71 | | |
| Compound A | 99 | 35 | 12 | | | |
| Compound F | 55 | | | | | |

From these typical results it can be seen that certain of the novel N-monoalkyl derivatives of Formula I above possess systemic activity more than adequate to meet the limitations discussed above. Moreover, the possession of this property is strictly limited to the small group of compounds wherein the term "Alk" of Formula I has the values of methyl, ethyl, n-propyl, isopropyl and tert.-butyl. Discovery of this property in this limited group of N-monoalkyl compounds is wholly unexpected when compared with the complete failure of Compound A, the most nearly analogous of the compounds previously known, and of the closely analogous N-allyl, N-(n-butyl) and N-(isobutyl) compounds.

The term "carrier" as used hereinafter means a vehicle used to transport the toxic agent to the pest to be destroyed. Such carriers may be solids, liquids, or gases. For instance, solids such as various clays, talcs, diatomaceous earths, fuller's earths, pyrophyllites, cellulosic sheets, sawdust, and the like, may carry the toxic agent through absorption with or without the assistance of a solvent or non-solvent carrier. Liquid carriers may be classed as solvents and non-solvents for the toxic agent. The non-solvents will, of course, require a minor proportion of an emulsification agent to thoroughly distribute the toxic agent through the carrier. Under such circumstances any well-known inert emulsification agent may be used in, say, a proportion of from 1% to 10%, such as the polyethylene glycol, sorbitol, mannitol, and pentaerythritol laurates. Such solvent carriers may be the phthalate, fumarate, maleate, acetate, and naphthenate esters, the monohydric aliphatic alcohols, the polyethylene glycols, ketones, aromatic hydrocarbons, such as benzene, toluene, xylene, and the polymethylated naphthalenes, ketone-alcohols, animal and vegetable oils such as the soybean, cottonseed, linseed, peanut, tallow, and the partial and completely hydrogenated products, and petroleum hydrocarbons such as petroleum ether, kerosene, and the refined spray oils or mixtures thereof. In some cases a combination of solvent and non-solvent being miscible. Gaseous carriers may be air, nitrogen, carbon dioxide, methyl chloride, difluorodichloromethane, and the like.

Regardless of the particular carrier chosen, or the amount of active ingredient in the composition, the material should be applied in correct amounts. Both the particular plant being grown and the state of growth at the time of application affect the foliage areas to be initially protected. These factors, among others, govern the rate of application of active material to the cultivated area. In certain cases this will range from as little as about one ounce up to about three pounds per acre of active material. In most cases from about four to about twenty-four ounces per acre will be found to constitute a good practice.

We claim:

1. A method of systemically protecting a living plant through an extended period of active growth from insects which infest said growing plants, said method comprising: applying to the foliage of said growing plant one application of an effective quantity of a systemically-active composition of low mammalian toxicity, said composition containing as its essential systemically-active ingredient at least one S-(N-alkylcarbamoylmethyl)-O,O-dimethylphosphorodithioate represented by the formula Alk-NHCOCH$_2$SSP(OCH$_3$)$_2$ wherein Alk represents an alkyl radical selected from the group consisting of methyl, ethyl, n-propyl, isopropyl and tertiary butyl.

2. A method of systemically protecting a living plant through an extended period of active growth from insects which infest said growing plants, said method comprising: applying to the foliage of said growing plant one application at the rate of from about one ounce to about three pounds per acre of a systemically-active composition of low mammalian toxicity, said composition containing as its essential systemically-active ingredient at least one S-(N-alkylcarbamoylmethyl)-O,O-dimethylphosphorodithioate represented by the formula Alk-NHCOCH$_2$SSP(OCH$_3$)$_2$ wherein Alk represents an alkyl radical selected from the group consisting of methyl, ethyl, n-propyl, isopropyl and tertiary butyl.

References Cited by the Examiner

UNITED STATES PATENTS

| | | | |
|---|---|---|---|
| 2,751,713 | 6/56 | Abramitis | 167—13 |
| 2,809,469 | 10/57 | Hartley | 167—13 |
| 2,811,476 | 10/57 | Metivier | 167—13 |
| 2,814,636 | 11/57 | Stahmann | 167—13 |
| 2,959,608 | 11/60 | Crouch | 260—461 |

FOREIGN PATENTS

| | | |
|---|---|---|
| 663,270 | 12/51 | Great Britain. |
| 791,824 | 3/58 | Great Britain. |

OTHER REFERENCES

De Pietri-Tonelli: "Ital. Agr." (Soc. Montecatini, Signa, Florence, Italy), No. 1, 8 pp. (January 1956) (in Italian) (see Chemical Abstracts 50, column 21, 16021(h) (1956)).

Jour. Ag. Food Chem., volume III (1955), pages 834–836.

JULIAN S. LEVITT, *Primary Examiner.*

MORRIS O. WOLK, IRVING MARCUS, LEWIS GOTTS, *Examiners.*